US011892624B2

(12) United States Patent
Price et al.

(10) Patent No.: US 11,892,624 B2
(45) Date of Patent: Feb. 6, 2024

(54) INDICATING AN OFF-SCREEN TARGET

(71) Applicant: Microsoft Technology Licensing, LLC, Redmond, WA (US)

(72) Inventors: Raymond Kirk Price, Redmond, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/241,725

(22) Filed: Apr. 27, 2021

(65) Prior Publication Data
US 2022/0342212 A1 Oct. 27, 2022

(51) Int. Cl.
*G02B 27/00* (2006.01)
*G02B 27/01* (2006.01)
(Continued)

(52) U.S. Cl.
CPC ........ *G02B 27/0093* (2013.01); *A63F 13/211* (2014.09); *A63F 13/25* (2014.09); *A63F 13/426* (2014.09); *A63F 13/537* (2014.09); *A63F 13/573* (2014.09); *G02B 27/017* (2013.01); *G02B 27/0189* (2013.01);
(Continued)

(58) Field of Classification Search
CPC ............... G02B 27/017; G02B 27/0093; G02B 27/0189; G02B 27/0138; G02B 2027/014; G02B 2027/019; G02B 2027/0138; G06F 3/0005; G06F 3/0346; A63F 13/211; A63F 13/24; A63F 13/426; A63F 13/537; A63F 13/573; A63F 13/837; A63F 2300/8082
See application file for complete search history.

(56) References Cited

U.S. PATENT DOCUMENTS 6,023,275 A 2/2000 Horvitz et al.
7,639,208 B1 12/2009 Ha et al.
(Continued)

FOREIGN PATENT DOCUMENTS

JP 2000149167 A 5/2000
JP 2002320770 A 11/2002
(Continued)

OTHER PUBLICATIONS

"Office Action Issued in Korean Patent Application No. 10-2016-7002161", dated Nov. 4, 2020, 10 Pages.
(Continued)

*Primary Examiner* — Nitin Patel
*Assistant Examiner* — Cory A Almeida
(74) *Attorney, Agent, or Firm* — Alleman Hall Creasman & Tuttle LLP

(57) ABSTRACT

In one method, device data including an orientation of a targeting device is received in a computing system. Target coordinates of the targeting device as projected onto a field-of-view of a display device are then located based on the device data. Pursuant to locating the target coordinates within a predefined margin, a target graphic indicating the target coordinates is superposed onto the field-of-view. Pursuant to locating the target coordinates outside of the predefined margin, an off-target graphic is superposed onto the field-of-view and aligned to a display perimeter of the display device.

20 Claims, 9 Drawing Sheets

(51) Int. Cl.
*A63F 13/211* (2014.01)
*A63F 13/25* (2014.01)
*A63F 13/426* (2014.01)
*A63F 13/573* (2014.01)
*A63F 13/537* (2014.01)
*A63F 13/837* (2014.01)

(52) U.S. Cl.
CPC ..... *A63F 13/837* (2014.09); *A63F 2300/8082* (2013.01); *G02B 2027/014* (2013.01); *G02B 2027/019* (2013.01); *G02B 2027/0138* (2013.01)

(56) References Cited

U.S. PATENT DOCUMENTS

| | | | |
|---|---|---|---|
| 7,812,815 | B2 | 10/2010 | Banerjee et al. |
| 8,140,197 | B2 | 3/2012 | Lapidot et al. |
| 8,217,856 | B1 | 7/2012 | Petrou |
| 9,041,741 | B2 | 5/2015 | Mabbutt et al. |
| 9,129,430 | B2 | 9/2015 | Salter et al. |
| 9,501,873 | B2 | 11/2016 | Salter et al. |
| 10,146,335 | B2 * | 12/2018 | Balan .................. H04N 13/344 |
| 2008/0218331 | A1 | 9/2008 | Baillot |
| 2010/0103103 | A1 | 4/2010 | Palanker et al. |
| 2010/0149073 | A1 | 6/2010 | Chaum et al. |
| 2010/0238161 | A1 | 9/2010 | Varga et al. |
| 2010/0253700 | A1 | 10/2010 | Bergeron |
| 2010/0309123 | A1 * | 12/2010 | Sawai .................. G06F 3/04812 345/157 |
| 2010/0328344 | A1 | 12/2010 | Mattila et al. |
| 2012/0050140 | A1 | 3/2012 | Border et al. |
| 2012/0075343 | A1 | 3/2012 | Chen et al. |
| 2012/0182206 | A1 | 7/2012 | Cok et al. |
| 2020/0368616 | A1 * | 11/2020 | Delamont ............. A63F 13/213 |

FOREIGN PATENT DOCUMENTS

| | | | | |
|---|---|---|---|---|
| JP | 2007267850 | A | | 10/2007 |
| JP | 2015504616 | A * | 2/2015 | ........... G02B 27/172 |
| JP | 2020044024 | A | | 3/2020 |
| KR | 20120000175 | A | | 1/2012 |
| KR | 20120015922 | A | | 2/2012 |
| KR | 20120025206 | A | | 3/2012 |

OTHER PUBLICATIONS

"Non-Final Office Action Issued in U.S. Appl. No. 13/927,056", dated Jan. 2, 2015, 7 Pages.

"Non-Final Office Action Issued in U.S. Appl. No. 14/805,762", dated Feb. 12, 2016, 7 Pages.

"Office Action Issued in European Patent Application No. 14740037.8", dated Jun. 9, 2017, 6 Pages.

"Non-Final Office Action Issued in U.S. Appl. No. 15/357,826", dated Dec. 13, 2016, 8 Pages.

"Office Action Issued in Indian Patent Application No. 7889/CHENP/2015", dated Oct. 7, 2020, 6 Pages.

Gustafson, et al., "Comparing Visualizations for Tracking Off-Screen Moving Targets", In Proceeding of Extended Abstracts on Human Factors in Computing Systems, Apr. 28, 2007, pp. 2399-2404.

Gustafson, et al., "Wedge: Clutter-Free Visualization of Off-Screen Locations", In Proceedings of the SIGCHI Conference on Human Factors in Computing Systems, Apr. 5, 2008, pp. 787-796.

Melzer, et al., "The Potential of an Interactive HMD", Published by US Army Aeromedical Research Laboratory, Aug. 2009, pp. 877-898.

"International Search Report & Written Opinion Issued in PCT Application No. PCT/US2014/043304", dated Sep. 19, 2014, 11 Pages.

Schinke, et al., "Visualization of Off-Screen Objects in Mobile Augmented Reality", In Proceedings of the 12th International Conference on Human Computer Interaction with Mobile Devices and Services, Sep. 7, 2010, pp. 313-316.

"Office Action Issued in Korean Patent Application No. 10-2016-7002161", dated May 6, 2021, 11 Pages.

"Holosun HS507C-X2 Pistol Red Dot Sight—ACSS® Vulcan® Reticle", Retrieved from: https://www.primaryarms.com/holosun-hs507c-v2-acss-pistol-red-dot-sight-acss-reticle, Retrieved on: Jun. 16, 2022, 7 Pages.

"International Search Report and Written Opinion Issued in PCT Application No. PCT/US22/023213", dated Sep. 26, 2022, 14 Pages.

"Invitation to Pay Additional Fees Issued in PCT Application No. PCT/US22/023213", dated Aug. 5, 2022, 8 Pages.

* cited by examiner

INDICATING AN OFF-SCREEN TARGET

BACKGROUND

Advances in computer technology continue to drive the explosive field of interactive gaming. Interactive, state-of-the-art game systems leverage recent innovations in virtual reality and high-bandwidth networking to create immersive, lifelike experiences. Nevertheless, the task of marshaling complex graphical information to deliver an intuitive virtual experience for the game player remains a formidable challenge.

SUMMARY

One aspect of this disclosure relates to a method enacted in a computing system. In this method, device data including an orientation of a targeting device is received in a display device. Target coordinates of the targeting device as projected onto a field-of-view of the display device are then located based on the device data. Pursuant to locating the target coordinates within a predefined margin, a target graphic is superposed onto the field-of-view, the target graphic indicating the target coordinates. Pursuant to locating the target coordinates outside of the predefined margin, an off-target graphic is superposed onto the field-of-view and aligned to a display perimeter of the display device.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

DETAILED DESCRIPTION

This disclosure relates to display technology for interactive targeting. In one implementation, at least one player in a game is equipped with a display device that presents an image of the player's real-world environment in the player's field-of-view. The player is also equipped with a targeting device, such as a gun, another weapon, or a sports implement. The targeting device is configured to launch real or virtual projectiles along a launch axis defined based on the location of the targeting device and on the orientation in which the targeting device is being held. Device data reporting the orientation of the targeting device is reported (e.g., wirelessly) to the display device, thereby allowing target coordinates of the targeting device to be computed and projected onto the field-of-view.

The general approach outlined above enables a suitably equipped game player to target various objects in the game environment—other players, inanimate stationary or moving objects, and so on. More specifically, the display device may be configured to superpose a target graphic (such as a reticle graphic) onto the field-of-view, centered on the target coordinates. Despite the advantages of that approach, an issue may arise when the targeting device is oriented such that the target coordinates are outside of the field-of-view. If the display device were configured to remove the target graphic in that event, then the player might assume erroneously that the targeting system has stopped working. That scenario could degrade the player experience.

In order to address the above issue and provide further advantages, this disclosure sets forth a series of solutions whereby the target graphic is superposed on the image provided that the target coordinates are located within a predefined margin in the player's field-of-view. Otherwise, an off-target graphic is superposed onto the field-of-view and aligned to the display perimeter of the display device—e.g., at a position that enables the player to estimate where the target coordinates may be. While primarily described herein in the context of a game scenario, the disclosed targeting approaches work equally well in scenarios in which real world projectiles are launched for non-game purposes. As such, nothing in this disclosure should be interpreted as being limited to game experiences only.

Figure 1:
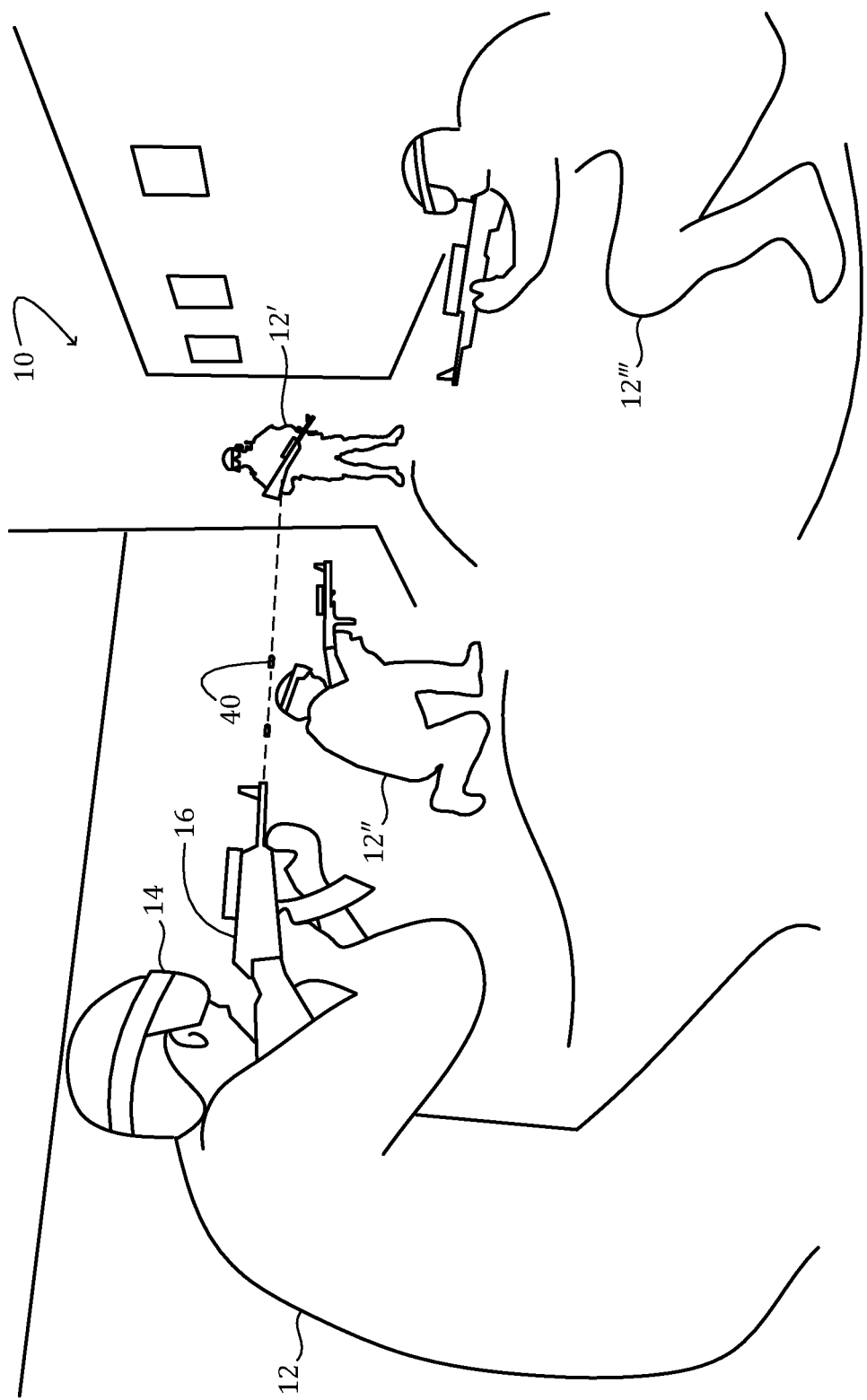
FIG. 1 shows aspects of an example game environment.

Turning now to the drawings, FIG. 1 shows aspects of a player environment 10 located in the real world. A plurality of game players 12 (viz., 12, 12', 12", and 12''') are situated in the player environment and engaged in a game. In the illustrated example, player environment 10 is an expansive, outdoor environment in which the players can move freely. The systems and methods herein may also be used in indoor environments of any configuration, including multi-level buildings. Player environment 10 may include real-world physical features such as buildings, even or uneven terrain, and various other geographic features. In some examples, the real-world features of the player environment may be elements of the game.

Any, some, or each of the players 12 in player environment 10 may participate in a game via a display device and an associated targeting device. In FIG. 1 each player is shown with a display device 14 and a targeting device 16. In other examples, a display device and targeting device for every player in a game may not be necessary. Generally speaking, each display device and corresponding player are co-located and, in some examples, co-located in a fixed relative orientation. To that end, the display device may be worn by the corresponding player. The display device may be affixed to the player's wrist, head, or other body part via a band or strap, for instance. In other examples, the display device may be carried, held, driven or piloted (if a vehicle) or otherwise predictably co-located relative to the corresponding player.

Figure 2:
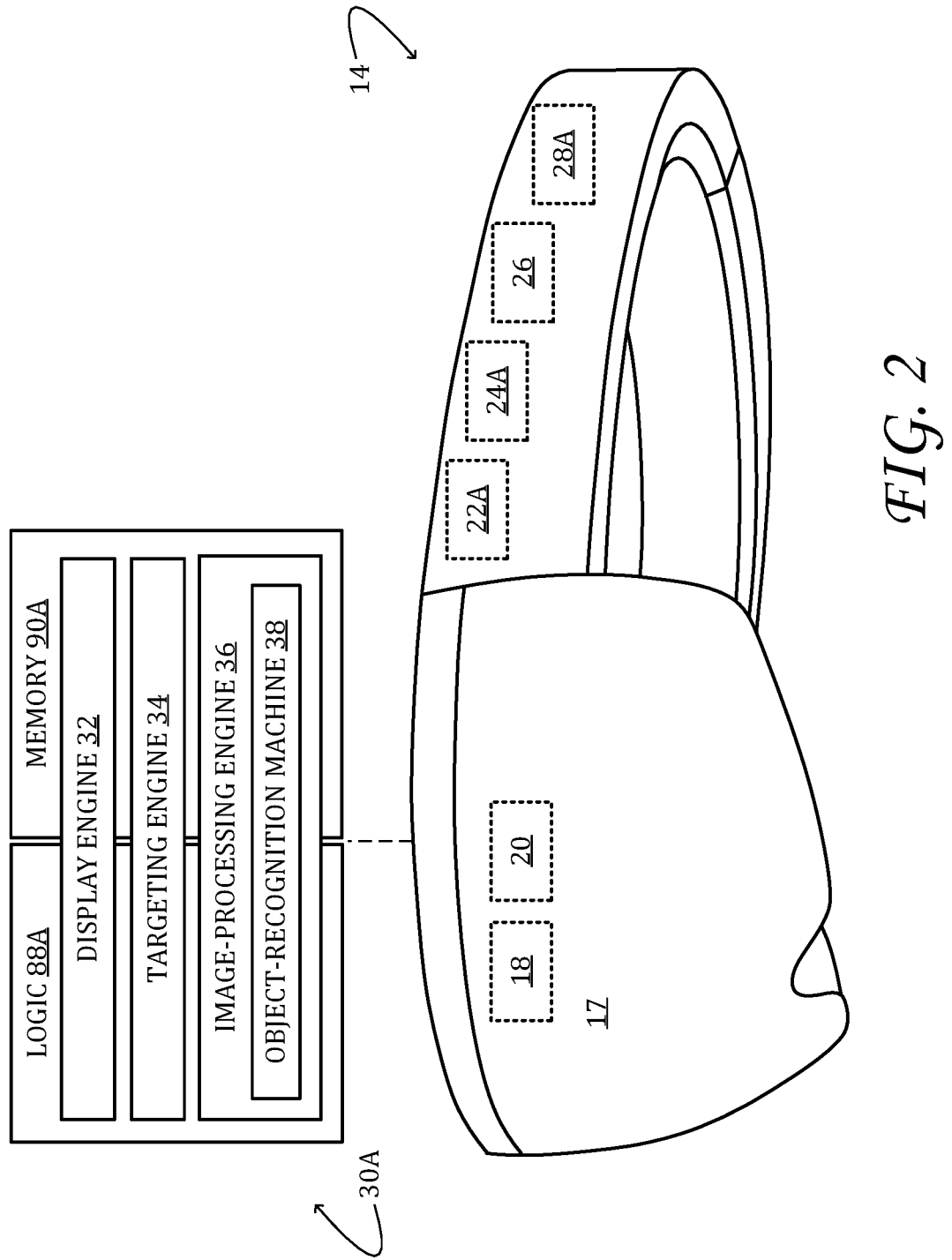
FIG. 2 shows aspects of an example display device.

FIG. 2 shows additional aspects of display device 14 in one, non-limiting example. Display device 14 takes the form of a near-eye augmented-reality (AR) device worn on the head of player 12. In that example, the display device may include an eyepiece or visor 17 that transmits real world imagery into the player's field-of-view. The display device also includes at least one near-eye display projector 18 configured to superpose virtual display imagery into the field-of-view. The virtual display imagery may provide data and/or messaging and may otherwise enhance the game experience for the player. For instance, the virtual display imagery may augment the player's perception of player environment 10 and/or other game players. In a futuristic battle game, the virtual display imagery may be used to impart an other-worldly appearance to the environment, for example. In other examples, the display device may take the form of a heads up display in a vehicle.

Display device 14 includes at least one outward-imaging display-device camera 20 such as a color camera, a monochrome camera, a thermal-imaging camera, a depth camera, or any combination thereof. The display device may also include an inward-imaging camera configured to resolve the pupil positions of the corresponding player and thereby enable gaze tracking. Display device 14 includes a wireless transmitter 22A and a wireless receiver 24A. The wireless transmitter and wireless receiver communicatively couple display device 14 to one or more remote devices, such as targeting device 16, any other player-associated computer system, and/or a network server. In alternative implementations, communications between the display and targeting devices, etc., may be wired. In the illustrated example, display device 14 includes a position sensor 26. The position sensor is configured to sense the position of the display device in environment 10 and may comprise any absolute or relative position-sensing componentry, such as a global positioning-system (GPS) receiver, WiFi location sensor, magnetic position sensor, simultaneous location and mapping (SLAM), etc. The display device may also include an orientation sensor 28A configured to sense the absolute or relative orientation of the display device. The orientation sensor may comprise an inertial-measurement unit (IMU, including an accelerometer, gyroscope, and/or electronic compass), a GPS receiver, optical flow analyzer, and/or any other orientation-sensing component. In display device 14, wireless transmitter 22A, wireless receiver 24A, position sensor 26, and orientation sensor 28A, inter alia, are coupled operatively to computer 30A.

Computer 30A includes a display engine 32 operatively coupled to near-eye display projector 18 and configured to render the display imagery generated by the near-eye display projector. Computer 30A also includes a targeting engine 34 configured to compute target coordinates of a targeting device 16 associated with display device 14 and with the player. These and other aspects of the computer are developed in further detail herein.

In some examples, computer 30A may include an image-processing engine 36. The image-processing engine may be configured to receive digital image data acquired by the display-device camera. The image-processing engine may support various kinds of image processing, such as SLAM, which may be used to compute the position and/or orientation of display device 14, thereby embodying position sensor 26 and/or orientation sensor 28A. To support SLAM and/or other functionality, image processing engine 36 includes an object-recognition machine 38. The object-recognition machine is configured to receive an image and to recognize and locate one or more predetermined image features and/or object types appearing in the image. Recognized image features may include corners, edges, colors, and/or other image primitives. Recognizing object types may include buildings, stationary targets such as a bullseye or goal post, and/or moving targets such as animals or human beings, for example. In some examples, object-recognition machine 38 may employ a previously trained convolutional neural network (CNN) or other machine-learning model. Significantly, the image submitted to object-recognition machine 38 need not be acquired by display-device camera 20. In some examples, the image submitted to the object-recognition machine may be acquired by a camera of a communicatively coupled targeting device and transmitted to display device 14 for processing.

This disclosure embraces a wide range of game experiences in which a player launches one or more real or virtual projectiles, attempting to hit a target. In some examples, such projectiles are launched from targeting device 16. For instance, in a battle-simulation game as shown in FIG. 1, player 12 launches virtual projectiles 40 by pulling the trigger of targeting device 16. Here the targeting device takes the form of a rifle—e.g., a simulated rifle or an actual rifle configured to operate in a training mode where each trigger pull launches virtual bullets in lieu of lethal bullets. In other shooting games, targeting device 16 may take the form of a handgun, shotgun, or laser gun; virtual projectiles 40 may comprise virtual bullets, slugs, darts, or wave packets. In other shooting games, targeting device 16 may take the form of a bow, and virtual projectiles 40 may comprise virtual arrows launched from the bow. In sports games, targeting device 16 may take the form of a sports implement, such as a virtual tennis racket, and virtual projectiles 40 may comprise virtual tennis balls. Naturally, the examples herein are not intended to be exhaustive.

Figure 3:
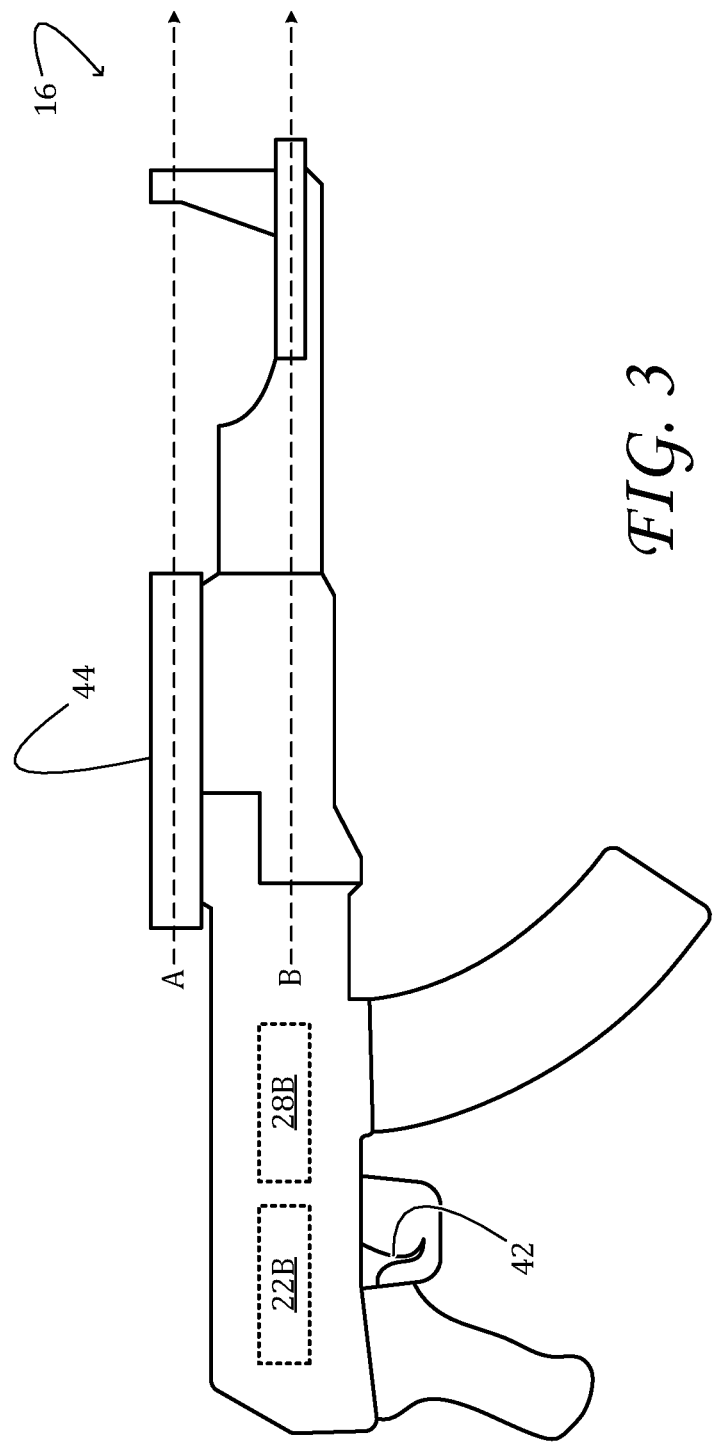
FIG. 3 shows aspects of an example targeting device.

FIG. 3 shows additional aspects of targeting device 16 in one, non-limiting example. In this example, the targeting device is a handheld device—more specifically a rifle or a facsimile thereof. In other examples, the targeting device may take the form of a vehicle-mounted weapon. The targeting device includes a wireless transmitter 22B that communicatively couples the targeting device to a display device 14 associated with the same player. The targeting device also includes an orientation sensor 28B. In some examples, the orientation sensor is configured to sense the absolute orientation of the targeting device. In other examples, the orientation sensor is configured to sense the orientation of the targeting device relative to communicatively coupled display device 14. The orientation sensor may comprise an IMU (including an accelerometer, gyroscope, and/or electronic compass), a GPS receiver, SLAM processor, optical flow analyzer, and/or any other orientation sensing component. In examples in which an IMU is used, the IMU optionally may be configured for three degrees-of-freedom (3DOF, rotation-only) tracking.

Targeting device 16 includes a trigger 42 and associated event-handling logic that executes when the trigger is pulled or otherwise actuated. The event-handling logic interfaces with wireless transmitter 22B and causes the wireless transmitter to transmit an indication of launch of a real or virtual projectile 40. The indication of launch is received by wireless receiver 24A of communicatively coupled display device 14.

In the illustrated example, targeting device 16 includes a rigidly mounted targeting-device camera 44. Optionally, the targeting-device camera shares its optical axis A with a rifle scope that player 12 may look through to view a targeted object. In this configuration, the image acquired by the targeting-device camera is naturally aligned with and parallel to the launch axis (e.g., the longitudinal axis) B of targeting device 16. In some examples, the targeting-device camera may comprise a depth camera or range finder. In some examples the targeting-device camera may comprise a thermal-imaging camera. The targeting device may be configured, via wireless transmitter 22B and appropriate control logic, to transmit the acquired image and/or range information to display device 14, for processing in image-processing engine 36 of the display device. In some examples, object-recognition machine 38 of the image-processing engine may enact object recognition on the image received from the targeting device. In some examples, recognition of reference objects in player environment 10 in the image acquired by targeting-device camera 44 may be used in a SLAM function to determine the absolute orientation of the targeting device in the environment. In some examples, absolute orientation data from SLAM, a GPS receiver, or the like, may be used to refine 6DOF or 3DOF orientation data from orientation sensor 28B via a sensor-fusion approach. Object-recognition may also be used to recognize and locate within the image a target object of one or more predefined object classes. Further, the object-recognition engine may indicate when a recognized object is imaged within a predetermined target graphic in the player's field-of-view and may provide other functionality.

Figure 4:
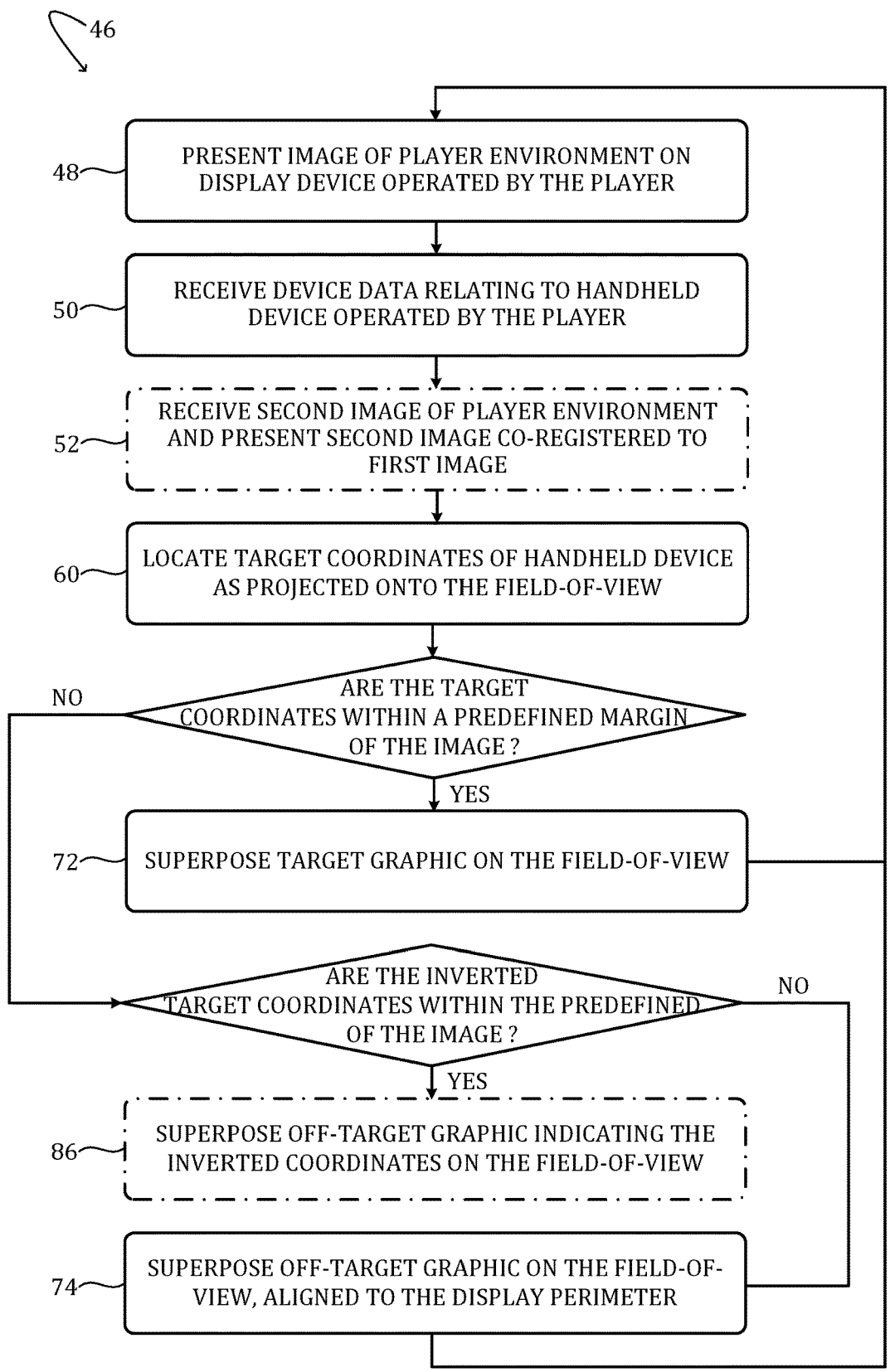
FIG. 4 shows aspects of an example method for displaying features of an interactive targeting experience.

FIG. 4 shows aspects of an example method 46 for displaying features of an interactive targeting experience. Method 46 may be enacted by a computing system supporting a human user (e.g., a game player) in any targeting scenario. The player also operates at least one targeting device that she may use to target an opponent, teammate, or other object. For ease of explanation, method 46 is described with reference to the devices and configurations introduced hereinabove. It will be understood, however, that this method may be used also with different devices and configurations.

At 48 of method 46 an image of a player environment, such as the environment in the field-of-view of the player, is presented on the display device. In examples in which the display device is a near-eye display device, the image may be presented on a visor or eyepiece of the display device. In some examples, the image presented may be acquired by a forward-facing camera of the display device and re-rendered for presentation on the visor or eyepiece by a display engine of the display device. This feature is useful for presentation of a far-infrared (i.e., thermal) image of the player environment and for a visible-light (i.e., color or monochrome) image on a fully immersive virtual-reality (VR) display device. On an augmented-reality (AR) display device, a real, visible-light image of the player environment may be presented on the visor or eyepiece of the display device by direct transmission of light through the visor or eyepiece.

At 50 device data relating to a targeting device operated by the player is received in the display device. The device data may be received via a wired or wireless receiver of the display device, for example. The device data may carry information that defines the orientation of the targeting device with respect to any suitable frame of reference of the game environment. Example frames of reference include an absolute (e.g., geographic) frame of reference or a frame of reference defined relative to the orientation of the display device or of the player. The orientation may include rotational coordinates of the launch axis of the targeting device—e.g., elevation and azimuth angles. In some examples, the orientation of the launch axis may be computed based on inertial and/or magnetic data sensed on the targeting device and transmitted to the display device. In some examples, the device data may also carry information that defines the location of the targeting device within the game environment. Alternatively, it may be assumed that the display and targeting devices operated by the same player are co-located, such that geolocation data furnished by the display device is suitable for estimating the location of the targeting device within the game environment. In some examples, the orientation and/or location of the launch axis may be computed based on one or more reference images acquired by a targeting-device camera—e.g., using SLAM—as a supplement or alternative to inertial and/or magnetic sensing.

In some examples, the location and orientation information noted above may be used by a targeting engine of the display device to determine the launch axis of the targeting device within the game environment—i.e., an axis along which the targeting device is capable of launching a real or virtual projectile. In some examples, the location and orientation of the launch axis may be combined with range information acquired via depth-imaging or other range-finding componentry on the targeting device. Accordingly, the device data communicated to the display device or otherwise processed by the computing system may include an estimate of distance from the targeting device to a nearest object in the player environment along the launch axis of the player device. Naturally the most accurate range information may be acquired by range-finding componentry arranged on the targeting device itself, and communicated to the display device. Nevertheless, suitable range information may be acquired alternatively by the display device itself, subject to heuristic assumptions, or by any suitable sensory componentry of the computing system.

In some examples, the device data may include information related to windage that would be experienced by a real or virtual projectile if launched by the targeting device into the player environment under current conditions. Such information may be acquired by a digital anemometer arranged on the targeting device or on the display device, or otherwise communicated to the display device via a network service.

In some examples, the image presented at 48 of method 46 may be one of a plurality of images of the player environment that are made available to the player. At optional step 52, accordingly, the display device receives a second image and presents the second image co-registered to the first image hereinabove, such that the first and second images share a common frame of reference and a common scale. In examples in which the first image is a visible-light image, the second image may be a far-infrared image, or vice versa. In the example shown in FIG. 5A, field-of-view 54 includes a real, visible-light image 56, transmitted through the visor or eyepiece of the display device, and a far-infrared image 58. The sizes and aspect ratios of the plural images may differ as in the illustrated example, or may be same in other examples. In some examples, an image may be acquired by a camera arranged on the targeting device and may be included in the device data received at 50.

Returning briefly to FIG. 4, at 60 a targeting engine of the display device locates, based on the device data, target coordinates of the targeting device as projected onto the field-of-view of the display device. In examples in which the device data includes range information, the act of locating the target coordinates in the field-of-view may include extending the launch axis of the targeting device to a point of intersection with the nearest object in the field-of-view. In examples where it may be assumed that the projectile in flight is little affected by gravity, the target coordinates may be assigned to the point of intersection. This condition may be satisfied when the velocity of the projectile is relatively great or the target is relatively close to the targeting device. In other examples, an appropriate kinematic model may be used to estimate the effect of gravity and/or projectile aerodynamics on the target coordinates. Likewise, in examples in which the device data includes windage information, the target coordinates may be adjusted based on windage.

One objective of locating the target coordinates in the field-of-view of the display device is to be able to indicate, using a superposed target graphic, where a projectile from the targeting device would strike, given the current position and orientation of the targeting device. Generally speaking, a superposed target graphic is most informative when the projected target coordinates are within or reasonably close to the field-of-view, but less informative when the projected target coordinates are far outside of the field-of-view. This distinction is illustrated in FIGS. 5A-C, which show selected aspects of the player's field-of-view in different targeting scenarios.

Figure 5A:
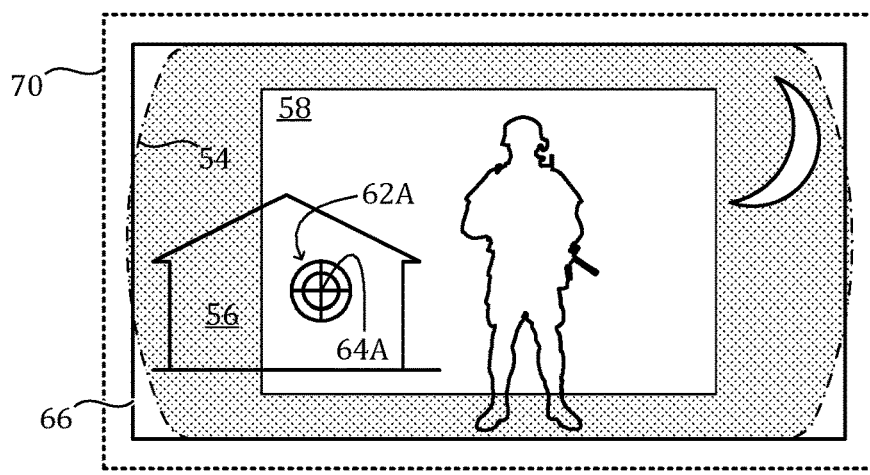
FIGS. 5A through 5C show aspects of an example field-of-view of a display device, including a target graphic.

Target graphic 62A of FIG. 5A indicates the position of target coordinates 64A in field-of-view 54. In the illustrated example, target graphic 62A includes a circle and inscribed reticle, each centered on the target coordinates. Because the target coordinates are well-inside of display perimeter 66 of the display device, it is possible to render a complete circle and inscribed reticle centered on the target coordinates. In some examples, the size and/or other aspects of the target graphic may vary depending on the type of projectile launched by the targeting device. The target graphic corresponding to a virtual bullet or wave packet may be small in comparison to a target graphic corresponding to a virtual shotgun slug, as an example.

Figure 5B:
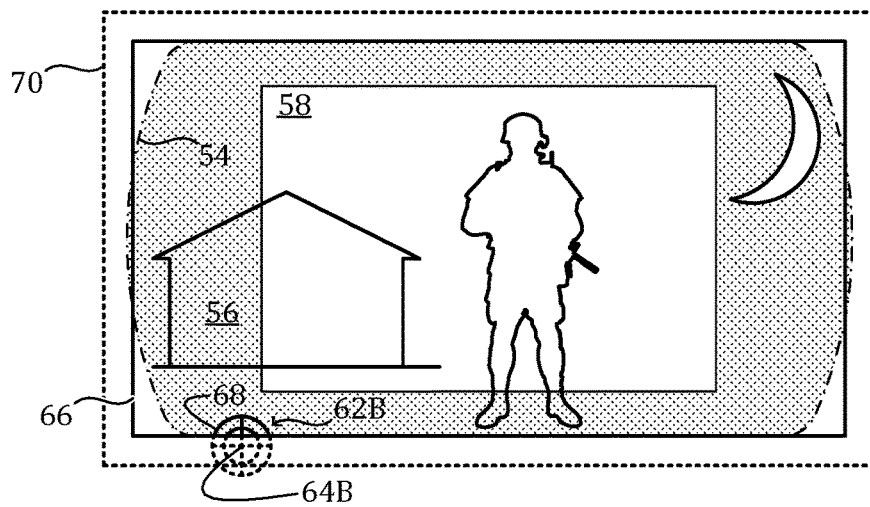

Target graphic 62B of FIG. 5B indicates the position of target coordinates 64B, which lay slightly outside of the display perimeter 66. Here the target graphic includes a circular arc 68 and a portion of an inscribed reticle. Even though target coordinates 64B lay outside of display perimeter 66, the position of the target coordinates will be evident to the player, as both the displayed circular arc and the displayed portion of the inscribed reticle remain visible within the display perimeter 66 when the circular arc 68 is centered on the target coordinates. In FIG. 5C, by contrast, target coordinates 64C lay so far outside of display perimeter 66 that no portion of a similarly-sized target graphic is displayable within the display perimeter 66. Further, it would be difficult for the player to assess the position of the target coordinates using a superposed target graphic enlarged relative to target graphics of the foregoing examples. In effect, the radius of the circular arc would have to be so large that the player would be unable to accurately estimate its center.

Figure 5C:
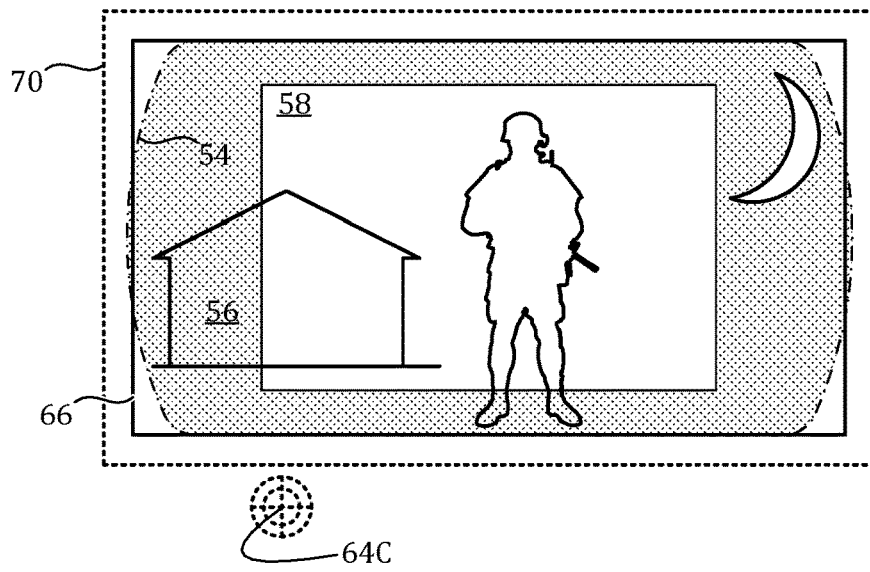

In light of the foregoing analysis, and with continued reference to FIGS. 5A-C, target coordinates in either of two categories may be revealed by each location operation enacted in method 46: either the target coordinates are located within a predefined margin 70 of display perimeter 66, or the target coordinates are located outside of the predefined margin. The thickness of predefined margin 70 is not particularly limited in method 46, but may be controlled, in some examples, by the desired size of the target graphic. For instance, in examples in which the target graphic includes a circular arc 68, the thickness of the margin 70 may be equal to the radius of the circular arc.

Returning again to FIG. 4, at 72, pursuant to locating the target coordinates within the predefined margin, a display engine of the display device superposes a target graphic onto the field-of-view, the target graphic indicating the target coordinates, directly or indirectly. As noted above, the target graphic may include a circular arc (or a full circle) with a reticle portion (or full reticle) optionally inscribed therein. In some examples the circular arc or reticle portion may be centered on the target coordinates. In other examples, the target graphic may comprise virtually any other geometric feature or features—e.g., lines, crosshairs, dots, a triangle, etc.—in lieu of the arc and reticle portions illustrated herein.

Even if the target coordinates lay outside of the predefined margin—e.g., because the targeting device is aimed outside of the field-of-view, it still may be desirable to present targeting information to the player. Such information may serve to assure the player that the targeting system remains functional. Further, intelligently presented targeting information may indicate to the player where the target coordinates may be relative to the player's field-of-view. Such information can help a disoriented player to reorient himself. In method 46, therefore, the display engine of the display device renders an informative target-like graphic pursuant to locating the target coordinates outside of the predefined margin. At 74, for instance, an off-target graphic is superposed on the field-of-view and aligned to the display perimeter of the display device.

Figure 5D:
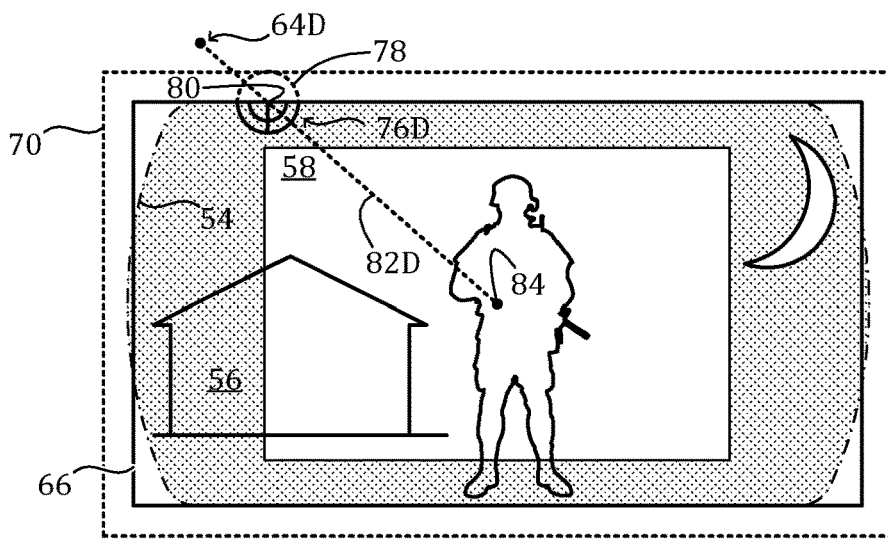
FIGS. 5D through 5G show aspects of an example field-of-view of a display device, including an off-target graphic.

FIG. 5D shows an example of an off-target graphic 76D presented in this manner. In some implementations, the off-target graphic may be similar in size and shape to the target graphic used in the same method; the off-target graphic may differ, however, with respect to color and/or style of superposition onto the image. For instance, if a target graphic is rendered in a green line type, then the off-target graphic may be rendered in a red line type; if the target graphic is rendered in a persistent, steady style, then the off-target graphic may be rendered in a blinking style. In the example illustrated in FIG. 5D, off-target graphic 76D, like target graphics 62 of the previous drawings, includes a circular arc with an inscribed reticle portion. Accordingly, the off-target graphic defines, in general terms, an ellipse 78 having an elliptical center 80 which is aligned to the display perimeter 66. It will be understood that the term 'ellipse' is used herein to refer to a shape having any degree of ellipticity, including a circle having no ellipticity. Despite the advantage of overall consistency in appearance of the target and off-target graphics, that aspect is in no way necessary, as the target and off-target graphics may be differently shaped in some examples. For instance, in implementations in which the target graphic comprises a circular arc with an inscribed reticle portion, the off-target graphic may comprise an arrow that points in the direction of the target coordinates; other shapes are also envisaged. In yet another example, the off-target graphic may comprise video—e.g., an animated graphic or even live video acquired by targeting-device camera 44 and transmitted in real time to display device 14.

Figure 5E:
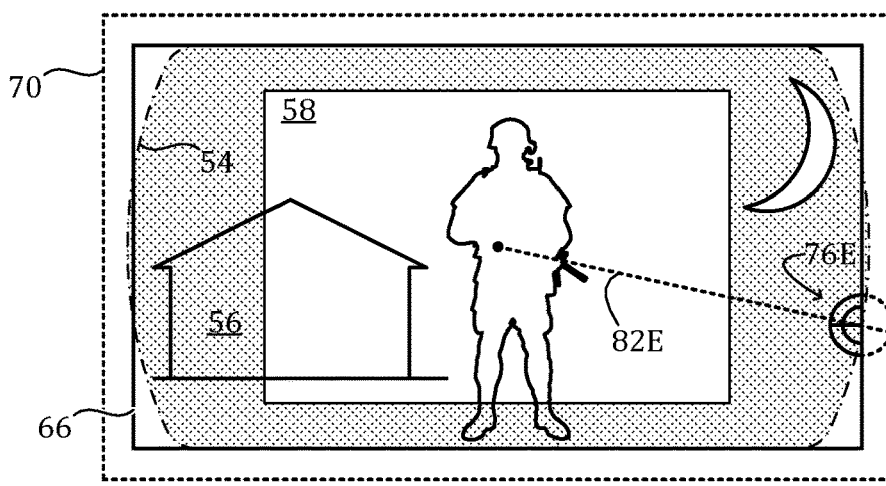

In the example illustrated in FIG. 5D, the elliptical center 80 of the ellipse defined by off-target graphic 76D is positioned on a straight line 82D that joins target coordinates 64D to the center 84 of display perimeter 66. This feature helps the player to mentally project where the actual target coordinates may be. FIG. 5E illustrates an analogous scenario, but one in which target coordinates 64E lay to a different side of the display perimeter, and in which off-target graphic 76E is positioned on a straight line 82E.

Figure 5F:
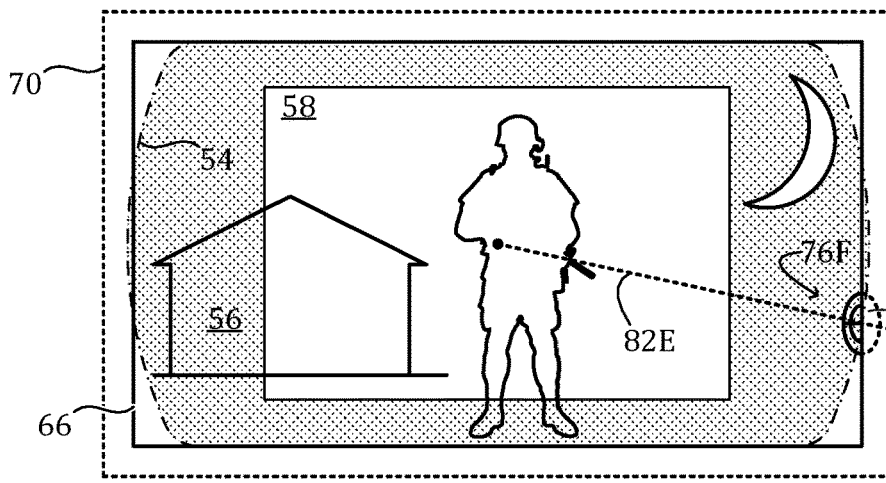

In some examples, the display engine may vary an off-target graphic as a function of distance S from the target coordinates to the perimeter of an image. The shape, color, line type, rendering style or weight of the off-target graphic may be varied, for instance. More particularly, at least one dimension of the off-target graphic may be varied as a function of the distance. This tactic may be used to impart a variable deformation to the off-target graphic that communicates to the player approximately how far the target coordinates are from his or her field of view. In the example illustrated in FIGS. 5E-F, the minor elliptical radius of the illustrated off-target graphic decreases with increasing distance from the target coordinates to the display perimeter, to signal to the player that the target coordinates are moving farther outside of the field-of-view in the indicated direction. In another example, the major axis of the off-target ellipse may be oriented along the straight line that joins the target coordinates to the center of the display perimeter. Here the ellipse may be stretched along the straight line as the coordinates recede farther from the player's field-of-view. In other examples, a minor and/or major elliptical radius or other dimension of the off-target graphic may vary as a function of the distance, and the ellipse may have any desired orientation relative to the straight line. In still other examples, the size and/or shape of the off-target graphic may change more drastically as the distance S changes—e.g., to an entirely different shape, such as an arrow of varying length or width.

Figure 5G:
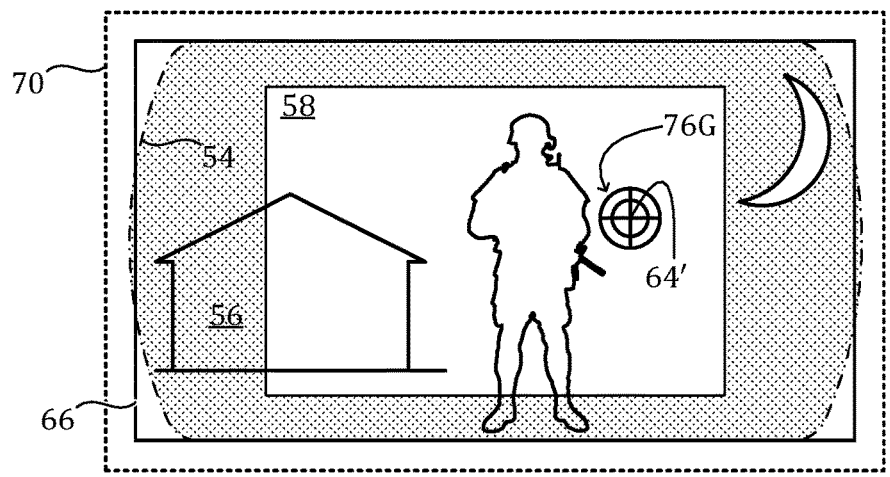

FIG. 4 illustrates an additional, optional feature wherein the alignment of the off-target graphic may differ in scenarios in which the targeting device is oriented substantially opposite the player's field-of-view. For instance, if a targeting device in the form of a rifle is carried on the player's shoulder with the barrel pointing behind the player, then the targeting engine will compute target coordinates—i.e., a point of intersection—well outside of the player's field-of-view. However, that point of intersection, if projected through an inversion center coincident with the player or an associated player device, may fall within the field-of-view and within the predefined margin. Thus, it may be helpful in some scenarios to communicate the inverted target coordinates to the player. At 86 of method 46, this is accomplished by superposing an off-target graphic indicating (e.g., centered on) the inverted point of intersection if the inverted point of intersection is within the predefined margin of the image. That scenario is illustrated in FIG. 5G, where off-target graphic 76G represents the inverted target coordinates 76'. Otherwise, or if optional step 86 is omitted from method 46, the target graphic is aligned to the perimeter of the image, as described at 74 above.

Figure 6:
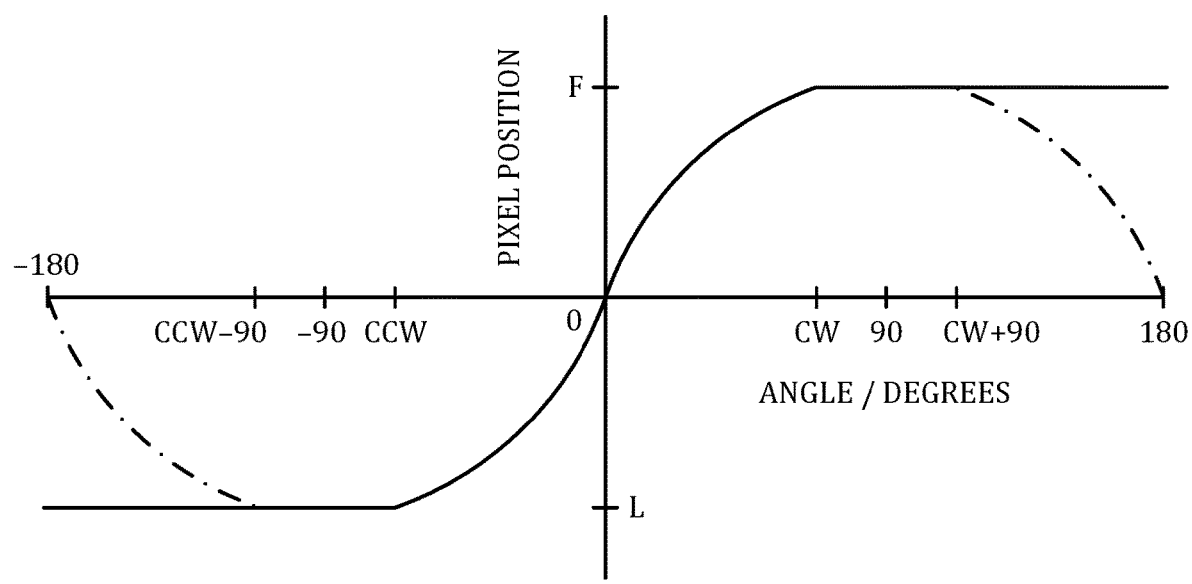
FIG. 6 is an example graph illustrating aspects of the method of FIG. 4.

The plot in FIG. 6 represents the result of applying the method of FIG. 4 in some examples. Here the independent variable plotted along the horizontal axis is the angle of the ray corresponding to the launch axis of a player's targeting device as projected onto the horizontal or vertical bisection plane of the same player's field-of-view. More specifically, the angle may be an azimuth angle measured in a horizontal plane containing the player's optical axis or an elevation angle measured in a vertical plane containing the player's optical axis (where the terms 'horizontal' and 'vertical' are defined relative to the orientation of the display device). The dependent variable plotted along the vertical axis is the pixel position corresponding to the center of the target or off-target graphic superposed onto the player's field-of-view. For ease of illustration, the plot in FIG. 6 describes the special case in which the ray corresponding to the launch axis intersects the nearest object in the game environment at a fixed distance from the targeting device.

The plot in FIG. 6 includes a solid curved segment extending from the counterclockwise limit (CCW) of the field-of-view in the horizontal or vertical measurement plane to the corresponding clockwise limit (CW). All along the solid curved segment, method 46 superposes a target graphic in the field-of-view at a pixel position that varies in proportion to the sine of the angle, between first pixel F and last pixel L, which lie substantially on the display perimeter.

The plot in FIG. 6 includes a solid straight-line segment extending from CW to 180 degrees and another solid straight-line segment extending from CCW to −180 degrees. All along the solid straight-line segments, method 46, in examples in which optional step 86 is omitted, superposes an off-target graphic on the field-of-view and aligned to the display perimeter.

The plot in FIG. 6 includes a dot-dashed curved segment extending from CW+90 degrees to 180 degrees and another dot-dashed curved segment extending from CCW−90 degrees to −180 degrees. All along the dot-dashed curved segments, method 46, in examples in which optional step 86 is included, superposes an off-target graphic indicating (e.g., centered on) the inverted target coordinates.

Figure 7:
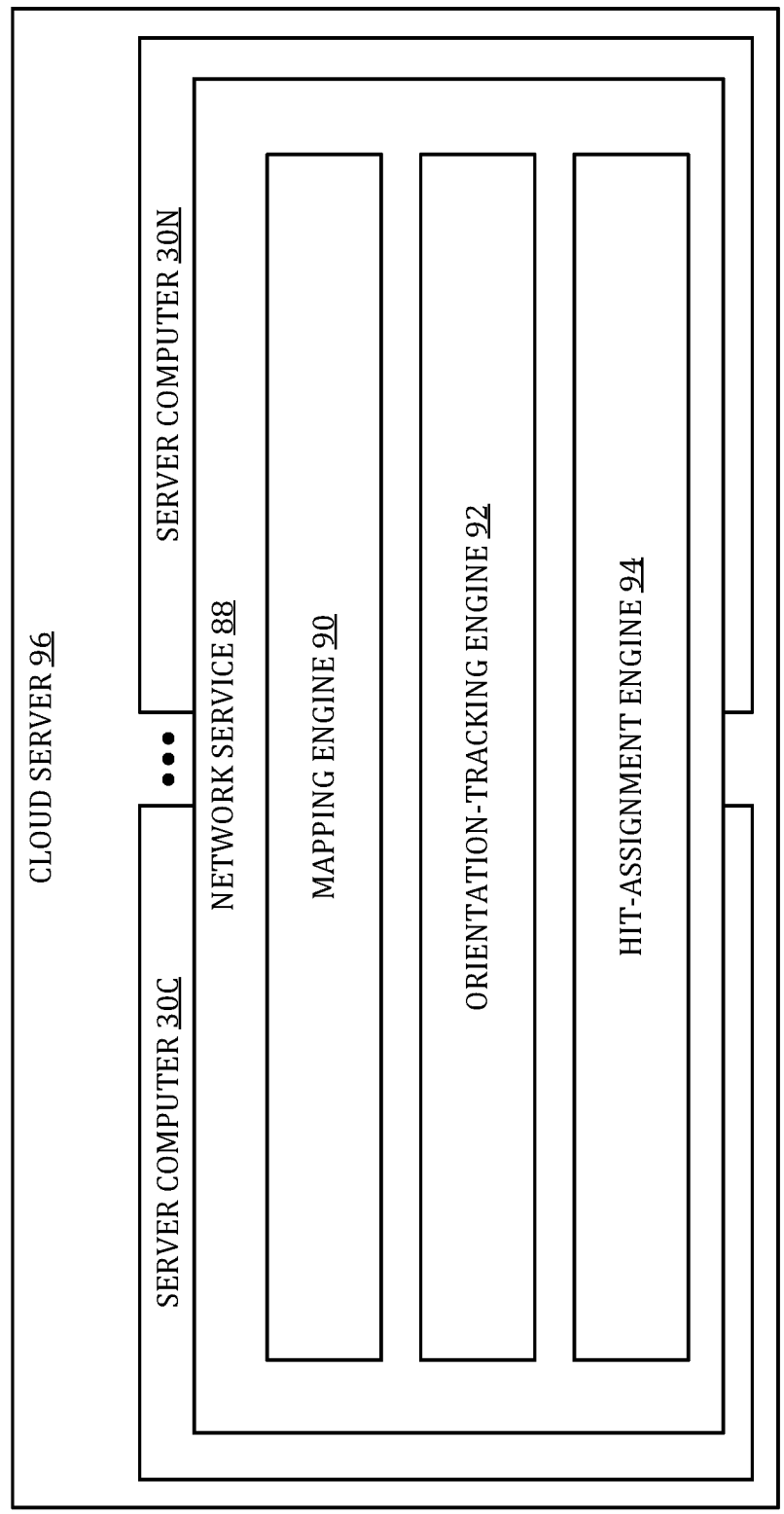
FIG. 7 shows aspects of an example network service.

In some examples, a game experience consonant with this disclosure may be further supported by a network service, as shown in FIG. 7. In the illustrated example, network service 88 includes a mapping engine 90 that maintains the overall state of the game by mapping the position of each of the players 12 in game environment 10. The network service also includes an orientation-tracking engine 92 that tracks the launch-axis orientations of the targeting devices 16 associated with the players. The launch-axis orientations may be used in the network service to determine which players have been targeted. The network service also includes a hit-assignment engine 94 that determines whether any game player, or other target, receives a projectile launched by another game player. These and other engines operating on the network service may be configured to receive output from any, some, or all of the display devices 14 of the players. That output may include the position of each player, the orientation of each player's targeting device, and an indication of whether a recognized object is imaged within a target graphic at the point at which a projectile is launched. The network service may also receive additional information from the display devices.

Figure 8:
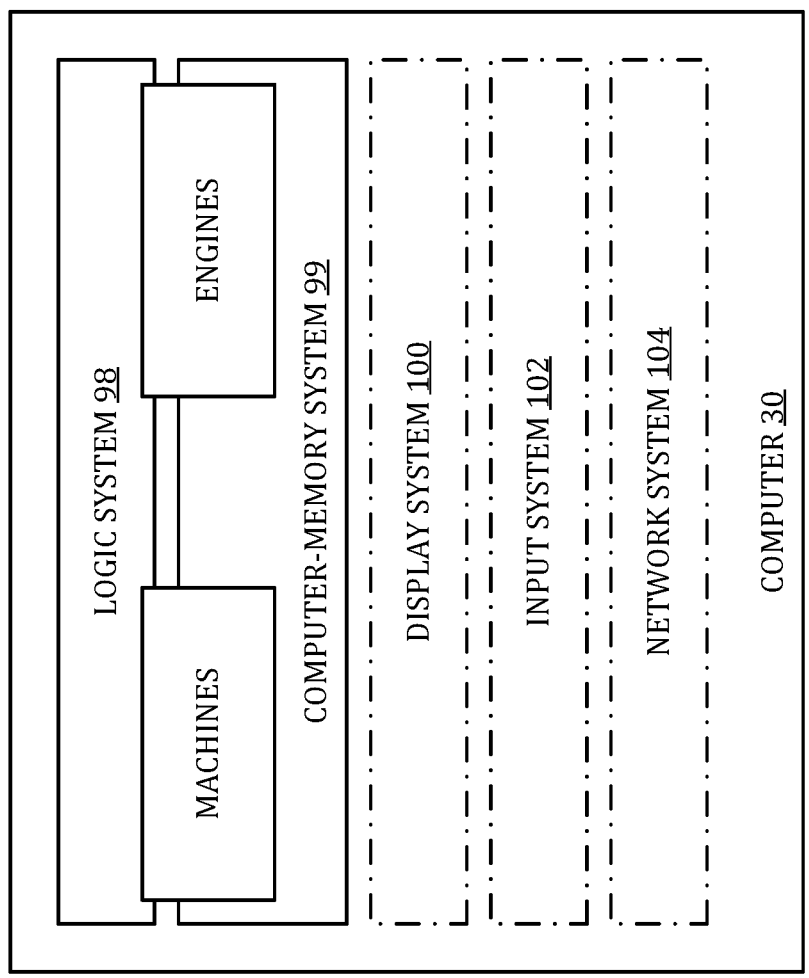
FIG. 8 shows aspects of an example computer system.

Network service 88 of FIG. 8 optionally may be executed on a cloud server 96 remote from game environment 10. The cloud server includes one or more remote server computers 30C through 30N. In other examples, the cloud server may execute on an edge server situated in proximity to one or more display devices 14 in game environment 10. In still other examples, the network service may be distributed among a plurality of computer devices located within the environment, such as the display devices 14 of players 12. In that manner, different portions of network service 88 may execute in parallel on the display devices worn by the players. Such portions may be marshaled by a controller device, in some examples, or may execute a strictly peer-to-peer protocol in other examples.

Hit signals, hit assignments, and position and orientation data may be represented by any suitable digital data structure and may be communicated between network service 88 and display devices 14 in any suitable manner. In some non-limiting examples, the data may be strongly typed and transmitted in the form of datagram and/or TCP packets. Likewise, a trigger signal or other indication of projectile launch, as well data representing the orientation of the launch axis of a targeting device, may transmitted from targeting device 16 to display device 14 in any suitable form. Examples include infrared, Bluetooth, etc.

The methods herein may be tied to a computer system of one or more computing devices. Such methods and processes may be implemented as an application program or service, an application programming interface (API), a library, and/or other computer-program product.

FIG. 9 provides a schematic representation of a computer 30 configured to provide some or all of the computer system functionality disclosed herein. Computer 30 may take the form of a personal computer, application-server computer, or any other computing device.

Computer 30 includes a logic system 98 and a computer-memory system 99. Computer 30 may optionally include a display system 100, an input system 102, a network system 104, and/or other systems not shown in the drawings.

Logic system 98 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 99 includes at least one physical device configured to temporarily and/or permanently hold computer system information, such as data and instructions executable by logic system 98. When the computer-memory system includes two or more devices, the devices may be collocated or remotely located. Computer-memory system 99 may include at least one volatile, nonvolatile, dynamic, static, read/write, read-only, random-access, sequential-access, location-addressable, file-addressable, and/or content-addressable computer-memory device. Computer-memory system 99 may include at least one removable and/or built-in computer-memory device. When the logic system executes instructions, the state of computer-memory system 99 may be transformed—e.g., to hold different data.

Aspects of logic system 98 and computer-memory system 99 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 98 and computer-memory system 99 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 100 may be used to present a visual representation of data held by computer-memory system 99. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 102 may comprise or interface with one or more input devices. An input device may include a sensor device or a user input device. Examples of user input devices include a keyboard, mouse, or touch screen.

When included, network system 104 may be configured to communicatively couple computer 30 with one or more other computer. The network system may include wired and/or wireless communication devices compatible with one or more different communication protocols. The network system may be configured for communication via personal-, local- and/or wide-area networks.

This disclosure is presented by way of example and with reference to the drawing figures listed above. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

In conclusion, one aspect of this disclosure is directed to a method enacted in a computing system. The method comprises: receiving device data including an orientation of a targeting device; locating, based on the device data, target coordinates of the targeting device as projected onto a field-of-view of a display device; pursuant to locating the target coordinates within a predefined margin, superposing a target graphic onto the field-of-view, the target graphic indicating the target coordinates; and pursuant to locating the target coordinates outside of the predefined margin, superposing an off-target graphic onto the field-of-view and aligned to a display perimeter of the display device.

In some implementations, the target graphic is superposed in a first color or style, and the off-target graphic is superposed in a second color or style. In some implementations, the target and off-target graphics are of similar shape. In some implementations, the off-target graphic defines an ellipse having an elliptical center aligned to the display perimeter. In some implementations, the elliptical center is on a straight line joining the target coordinates to a center of the display perimeter. In some implementations, superposing the off-target graphic onto the field-of-view includes varying the off-target graphic as a function of distance from the target coordinates to the display perimeter. In some implementations, varying the off-target graphic includes varying a dimension of the off-target graphic. In some implementations, the method further comprises receiving an image of the player environment and presenting the image on the display device, co-registered to the field-of-view. In some implementations, a perimeter of the image differs from the display perimeter. In some implementations, the device data includes an estimate of distance from the targeting device to a nearest object in the field-of-view along a launch axis of the player device. In some implementations, locating the target coordinates as projected onto the field-of-view includes extending the launch axis to a point of intersection with the nearest object, and the target coordinates are assigned to the point of intersection. In some implementations, the off-target graphic is aligned to the display perimeter if the point of intersection, inverted through the targeting device, is located outside of the predefined margin, and the method further comprises superposing the off-target graphic to indicate the inverted point of intersection if the inverted point of intersection is within the predefined margin. In some implementations, the off-target graphic may include live video.

Another aspect of this disclosure is directed to a display device comprising: a visor or eyepiece configured to transmit an image of a player environment, a wired or wireless receiver configured to receive device data responsive to an orientation of a targeting device, a targeting engine, and a display engine. The targeting engine is configured to locate, based on the device data, target coordinates of the targeting device as projected onto a field-of-view of the display device. The display engine is coupled operatively to the visor or eyepiece and configured to: superpose a target graphic onto the field-of-view pursuant to locating the target coordinates within a predefined margin, the target graphic indicating the target coordinates, and superpose an off-target graphic onto the field-of-view pursuant to locating the target coordinates outside of the predefined margin, the off-target graphic being aligned to a display perimeter of the display device.

In some implementations, the image is a first image and the display engine is further configured to receive a second image and to present the second image in the field-of-view, co-registered to the first image. In some implementations, the second image is acquired by the targeting device and is included in the device data. In some implementations, the second image is a far-infrared image.

Another aspect of this disclosure is directed to a method enacted in a computing system. The method comprises: receiving device data including an orientation of a targeting device; locating, based on the device data, target coordinates of the targeting device as projected onto a field-of-view of a display device; pursuant to locating the target coordinates within a predefined margin, superposing a target graphic of a first color onto the field-of-view, the target graphic indicating the target coordinates; and pursuant to locating the target coordinates outside of the predefined margin, superposing an off-target graphic of a second color onto the field-of-view, the off-target graphic being of similar shape as the target graphic and aligned to a display perimeter of the display device.

In some implementations, the device data includes an estimate of distance from the targeting device to a nearest object in the field-of-view along a launch axis of the player device. In some implementations, locating the target coordinates as projected onto the field-of-view includes extending the launch axis to a point of intersection with the nearest object, and the target coordinates are assigned to the point of intersection.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. Enacted in a computing system, a method comprising:
   receiving device data including an orientation of a targeting device;
   locating target coordinates at an intersection of a launch axis of the targeting device and a nearest object, wherein the target coordinates are determined based on the device data and using range information from range-finding componentry;
   projecting the target coordinates relative to a field-of-view of a display device;
   pursuant to locating the projected target coordinates within a predefined margin of the field-of-view of the display device, superposing a target graphic onto the field-of-view, the target graphic indicating the target coordinates; and
   pursuant to locating the projected target coordinates outside of the predefined margin, superposing an off-target graphic including live video onto the field-of-view and aligned to a display perimeter of the display device.

2. The method of claim 1 wherein the target graphic is superposed in a first color or style, and the off-target graphic is superposed in a second color or style.

3. The method of claim 1 wherein the target and off-target graphics are of similar shape.

4. The method of claim 1 wherein the off-target graphic defines an ellipse having an elliptical center aligned to the display perimeter.

5. The method of claim 4 wherein the elliptical center is on a straight line joining the target coordinates to a center of the display perimeter.

6. The method of claim 1 wherein superposing the off-target graphic onto the field-of-view includes varying the off-target graphic as a function of distance from the target coordinates to the display perimeter.

7. The method of claim 6 wherein varying the off-target graphic includes varying a dimension of the off-target graphic.

8. The method of claim 1 further comprising receiving an image of the player environment and presenting the image on the display device, co-registered to the field-of-view.

9. The method of claim 8 wherein a perimeter of the image differs from the display perimeter.

10. The display device of claim 8 wherein the image is a first image, the method further comprising receiving a second image and presenting the second image in the field-of-view, co-registered to the first image.

11. The display device of claim 10 wherein the second image is acquired by the targeting device and is included in the device data.

12. The display device of claim 10 wherein the second image is a far-infrared image.

13. The method of claim 1 wherein the device data includes an estimate of distance from the targeting device to the nearest object in the field-of-view along the launch axis of the player device.

14. The method of claim 1 wherein the off-target graphic is aligned to the display perimeter if the point of intersection, inverted through the targeting device, is located outside of the predefined margin, the method further comprising superposing the off-target graphic to indicate the inverted point of intersection if the inverted point of intersection is within the predefined margin.

15. The method of claim 1 wherein each of the target graphic and the off-target graphic indicate via the target coordinates where a projectile from the targeting device would strike, based on the orientation and current position of the targeting device.

16. A display device comprising:
a visor or eyepiece configured to transmit a first image of a player environment;
a wired or wireless receiver configured to receive device data responsive to an orientation of a targeting device;
a targeting engine configured to locate target coordinates at an intersection of a launch axis of the targeting device and a nearest object, the intersection projected relative to a field-of view of the display device, wherein the target coordinates are determined based on the device data and using range information from range-finding componentry; and
a display engine coupled operatively to the visor or eyepiece and configured to:
receive a second image, which is a far-infrared image,
present the second image in the field-of-view of the display device, co-registered to the first image,
superpose a target graphic onto the field-of-view of the display device pursuant to locating the target coordinates projected within a predefined margin of the field-of-view, the target graphic indicating the target coordinates, and
superpose an off-target graphic onto the field-of-view of the display device pursuant to locating the target coordinates projected outside of the predefined margin, the off-target graphic being aligned to a display perimeter of the display device.

17. The display device of claim 16 wherein each of the target graphic and the off-target graphic indicate, via the target coordinates, where a projectile from the targeting device would strike, based on the orientation and current position of the targeting device.

18. Enacted in a display device, a method comprising:
transmitting a first image of a player environment through a visor or eyepiece of the display device;
receiving device data responsive to an orientation of a targeting device via a wired or wireless receiver of the display device;
in a targeting engine of the display device, locating target coordinates at an intersection of a launch axis of the targeting device and a nearest object, the intersection projected relative to a field-of-view of the display device, wherein the target coordinates are determined based on the device data and using range information from range-finding componentry;
in a display engine of the display device coupled operatively to the visor or eyepiece:
receiving a second image, which is a far-infrared image,
presenting the second image in the field-of-view, co-registered to the first image,
pursuant to locating the target coordinates projected within a predefined margin of the field-of-view, superposing a target graphic onto the field-of-view, the target graphic indicating the target coordinates; and
pursuant to locating the target coordinates projected outside of the predefined margin, superposing an off-target graphic onto the field-of-view, the off-target graphic being aligned to a display perimeter of the display device.

19. The method of claim 18 wherein the off-target graphic includes live video.

20. The method of claim 18 wherein the device data includes an estimate of distance from the targeting device to the nearest object in the field-of-view along the launch axis of the targeting device.

\* \* \* \* \*